(12) United States Patent
Furnback

(10) Patent No.: US 6,421,856 B1
(45) Date of Patent: Jul. 23, 2002

(54) BABY CHANGING TABLE FOR AUTOMOBILES

(76) Inventor: Thomas A. Furnback, 84 Millhurst Rd., Manalapan, NJ (US) 07726

(*) Notice: Subject to any disclaimer, the term of this patent is extended or adjusted under 35 U.S.C. 154(b) by 27 days.

(21) Appl. No.: 09/635,567

(22) Filed: Aug. 10, 2000

(51) Int. Cl.[7] ................................................ A47D 5/00
(52) U.S. Cl. ............................................. 5/655; 5/118
(58) Field of Search ............................. 5/655, 94, 118, 5/136, 947, 486; 297/219.12

(56) References Cited

U.S. PATENT DOCUMENTS

| | | | | |
|---|---|---|---|---|
| 1,263,097 A | * | 4/1918 | Mooremeister | 5/94 |
| 1,304,966 A | * | 5/1919 | Haney | 5/118 |
| 1,343,881 A | * | 6/1920 | Christensen | 5/485 |
| 1,653,246 A | * | 12/1927 | Zichy | 5/94 X |
| 1,689,091 A | * | 10/1928 | Watt | 5/94 |
| 1,741,592 A | * | 12/1929 | Tilney | 5/118 |
| 2,359,599 A | * | 10/1944 | Allen | 5/94 X |
| 2,409,934 A | * | 10/1946 | Haggard et al. | 5/118 X |
| 2,460,308 A | * | 2/1949 | Pribil | 5/655 X |
| 2,495,482 A | * | 1/1950 | Rogatz | 5/655 X |
| 2,602,938 A | * | 7/1952 | Williams | 5/118 |
| 2,853,718 A | * | 9/1958 | Lim | 5/94 |
| 3,037,216 A | * | 6/1962 | Stringer | 5/118 |
| 3,046,572 A | * | 7/1962 | Eames et al. | 5/136 |
| 3,148,388 A | * | 9/1964 | Espersen | 5/485 |
| 3,269,621 A | * | 8/1966 | Dishart | 5/655 X |
| 3,436,770 A | * | 4/1969 | Turner | 5/94 |
| 3,574,872 A | * | 4/1971 | Mattila | 5/94 |
| 3,735,430 A | * | 5/1973 | Platz | 5/118 |
| 3,784,990 A | * | 1/1974 | Elisofon et al. | 5/94 |
| 4,064,576 A | * | 12/1977 | Threatt | 5/485 |
| 4,125,903 A | * | 11/1978 | Farrell | 5/485 X |
| 4,510,634 A | * | 4/1985 | Diedrich et al. | 5/94 X |
| 4,781,277 A | * | 11/1988 | Lim | 5/655 X |
| 4,943,105 A | * | 7/1990 | Kacar et al. | 5/94 X |
| 5,215,172 A | * | 6/1993 | Stevenson | 5/655 X |
| 5,299,336 A | * | 4/1994 | Marteeny | 5/655 |
| 5,438,719 A | * | 8/1995 | Anthony | 5/485 |
| D367,771 S | * | 3/1996 | Julian | 5/655 X |
| 5,662,380 A | * | 9/1997 | Tam et al. | 297/219.12 X |
| 5,722,100 A | * | 3/1998 | Jozwiak | 5/655 X |
| 5,988,744 A | * | 11/1999 | Franchak | 297/219.12 X |
| 6,095,614 A | * | 8/2000 | Canna et al. | 5/655 X |
| 6,272,704 B1 | * | 8/2001 | Cutler | 5/655 |

* cited by examiner

Primary Examiner—Robert G. Santos
(74) Attorney, Agent, or Firm—Charles I. Brodsky

(57) ABSTRACT

A baby changing table having an upper front section and a lower rear section, with the upper front section being secured about the headrest and around the seat hinges of the front seat of an automobile, and with the lower section extending at an angle rearwardly towards the back seat, but falling short thereof, although onto the knees of a parent or adult sitting there, and whose knees support the lower section and an infant placed thereon to be cleaned and changed—all whether the automobile is moving or preferably, when it is stationary.

12 Claims, 3 Drawing Sheets

BABY CHANGING TABLE FOR AUTOMOBILES

FIELD OF THE INVENTION

This invention relates to vehicular travel with infant children and, more particularly, to a baby changing table which can be easily opened in an automobile for use, and thereafter simply stowed away.

BACKGROUND OF THE INVENTION

As is known, most State laws require the use of a car seat for transporting an infant in an automobile. As is also known, such laws typically require the car seat be secured towards the middle of the bench seat in the back of the vehicle. This is so whether the front seats be of the bench or bucket variety.

As one can appreciate, parents must often change their infant's diaper while traveling in a car. With the car seat secured in the middle of the back seat bench, there is usually not sufficient space to allow the parent to sit while attempting to lay the infant flat to change the diaper. On the other hand, laying the infant flat on the seat while having the door opened with the parent standing on the outside leaning over, leads to the very real possibility of cold air from the outside being let in, as well as any rain, sleet or snow if attempted during a storm. Clearly, this second alternative requires the automobile to be first stopped before changing can take place—but if attempted when it is moving, the necessary sideways leaning to accomplish the changing in an insufficient back seat space makes the job quite difficult to do.

OBJECTS OF THE INVENTION

It is an object of the present invention, therefore, to provide a baby changing table for automobiles which can be accessed easily, preferably when the automobile is stopped, but even while the vehicle is in motion.

It is a second object of the invention to provide such a baby changing table without having to alter the interior design of the vehicle.

It is an additional object of the invention to provide such a baby changing table which can be operated simply, whether the front seat of the vehicle be designed with bench seats or bucket seats, and which can be accessed from behind either the driver's seat or the front passenger seat.

It is yet another object of the invention to provide a baby changing table of this type which can be retained in place in the automobile, or stored away in the trunk when not needed, whichever is preferable.

SUMMARY OF THE INVENTION

As will become clear from the following description, the baby changing table for automobile use according to the invention employs a frame having a substantially planar upper section, a substantially planar lower section and first means bracing the upper and lower sections together along their facing edges. Second means hinges the upper and lower sections adjacent one another when in a closed position, and at an angle apart from one another when opened. Third means then fastens the first means with the seat hinges of the front seat construction of the automobile, with fourth means fastening the substantially planar upper section with the headrest of the automobile's front seat. Lastly, fifth means releasably secures the upper and lower sections for storage or use, with the substantially planar lower section being of a length to fall short of the rear seat of the automobile when hinged open for use, whether the front seat of the automobile is slid forward or back. As will be described, the third means fastening to the seat hinges of the front seat belt construction may comprise a first strap arrangement, while the fourth means fastening the substantially planar upper section with the headrest of the front seat may comprise a second strap configuration.

In accordance with a preferred embodiment of the invention, the second means hinging the upper and lower sections of the frame is adjustable in setting the angles of the two sections with respect to one another. To accommodate infants of differing size—or just to facilitate the changing of the infant by the parent sitting in the rear seat of the automobile—both the lower planar section and the upper planar section can be adjusted in length (with the lower section incorporating telescoping arms, in one arrangement, and with the upper section having a series of predetermined pin positions for securement at different positions).

In this preferred embodiment of the invention, the baby changing table includes a cloth cover overlying the frame, when fabricated of metal or plastic. Such cover may include, at the upper section, for example, at least one pocket at a top side to store, for example, baby-wipes or disposable diapers. As will be appreciated, the pocket(s) may be closeably openable, as by the off the lower section when being changed, and to hold the baby from squirming while the infant is being cleaned, the preferred embodiment of the invention further includes a strap extending between opposite side edges of the planar lower section, to buckle, or otherwise couple, across the infant's torso in restraining the baby.

As will be understood by those skilled in the art, the baby changing table can be employed with the front passenger seat or with the front driver's seat of an automobile, with such seat being moved forwardly or rearwardly, and whether the seat is in an upright position, or tilted forward. With the described length of the upper and lower planar sections being such that the lower section falls short of the rear seat of the automobile, the parent (or other adult) has sufficient room to sit on the back seat, while angling the lower planar section atop their knees, to rest the infant thereupon for cleaning and changing.

As will also be understood, the baby changing table of the invention could be employed equally as well for those automobile manufactures having a front bench seat—instead of bucket seats—as all that is necessary is to be able to strap the substantially planar upper section about the front seat's headrest. Of course, once the baby changing is complete, all that is necessary to close the table is to fold the lower section upwardly about its hinges to the upper section, where it can be releasably secured in any appropriate manner.

BRIEF DESCRIPTION OF THE DRAWINGS

These and other features of the invention will be more clearly understood from a consideration of the following description, taken in connection with the accompanying drawings, in which.

DETAILED DESCRIPTION OF THE INVENTION

Figure 1:
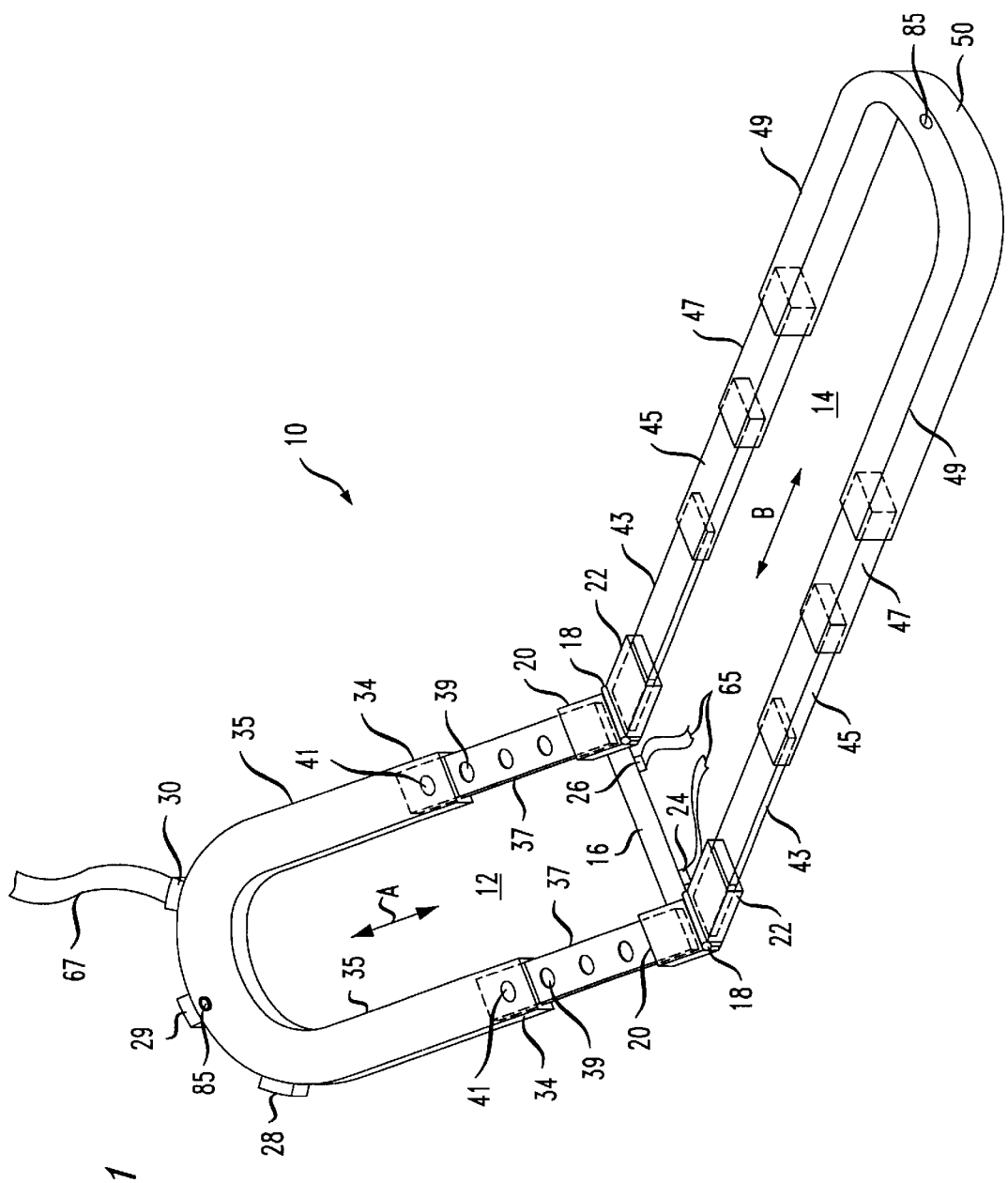
FIG. 1 is a side perspective view of the frame of the baby changing table of the invention, with its cover removed.

In the drawings, the frame of the baby changing table 10—fabricated of metal or plastic—includes a substantially planar upper section 12 and a substantially planar lower section 14. A brace 16 joins the sections 12, 14 together, joining their facing edges in any appropriate manner. A pair of hinges 18—one on either side—couples the upper and lower sections 12, 14 together, at predetermined angles with respect to one another, and in any well-known manner. As shown, the upper section 12 secures with the hinges 18 as at 20, while the lower section 14 couples with the hinges 18 at 22. As part of the brace 16, a pair of brackets 24, 26 are included, to receive individual straps 65 which couple around the hinges of the front seat of the automobile—as, for instance, wrapping around the hinges and back to the bracket to secure therewith. In like manner, a second pair of brackets 28, 30 are coupled with the upper section 12 to receive a single strap 67, extending from one of the brackets 28, 30 in circling about the headrest on the front seat of the automobile, and joining at the other bracket so as to be held in place by the headrest.

As will be appreciated by those skilled in the art, the straps which couple with the brackets 24 and 26, and which couple with the brackets 28 and 30, are each tightenable to fastedly secure and hold with the front seat. The frame 10 will thus move, as the front seat of the automobile—be it a bench seat, a front passenger bucket seat, or a front driver bucket seat—is moved forwardly or rearwardly within the passenger compartment of the automobile, and will also tilt with it as the front seat is tilted. As indicated at 34, the upper section 12 is composed of two portions 35, 37 (one fitting within the other) to extend or shorten the length of the upper section 12 as measured in the direction of Arrow A. At 34, a push-pin 41 may be utilized, as extending from the section 35 to fit within one of several apertures 39 on the portion 37, to be there held in place. Such location of the pin 41 within an aperture 39 can be selected by the person changing the infant in accordance with the height needed to level the apparatus flat on the lap, or to adjust it to open level depending upon the design of the vehicle's seats.

Figure 2:
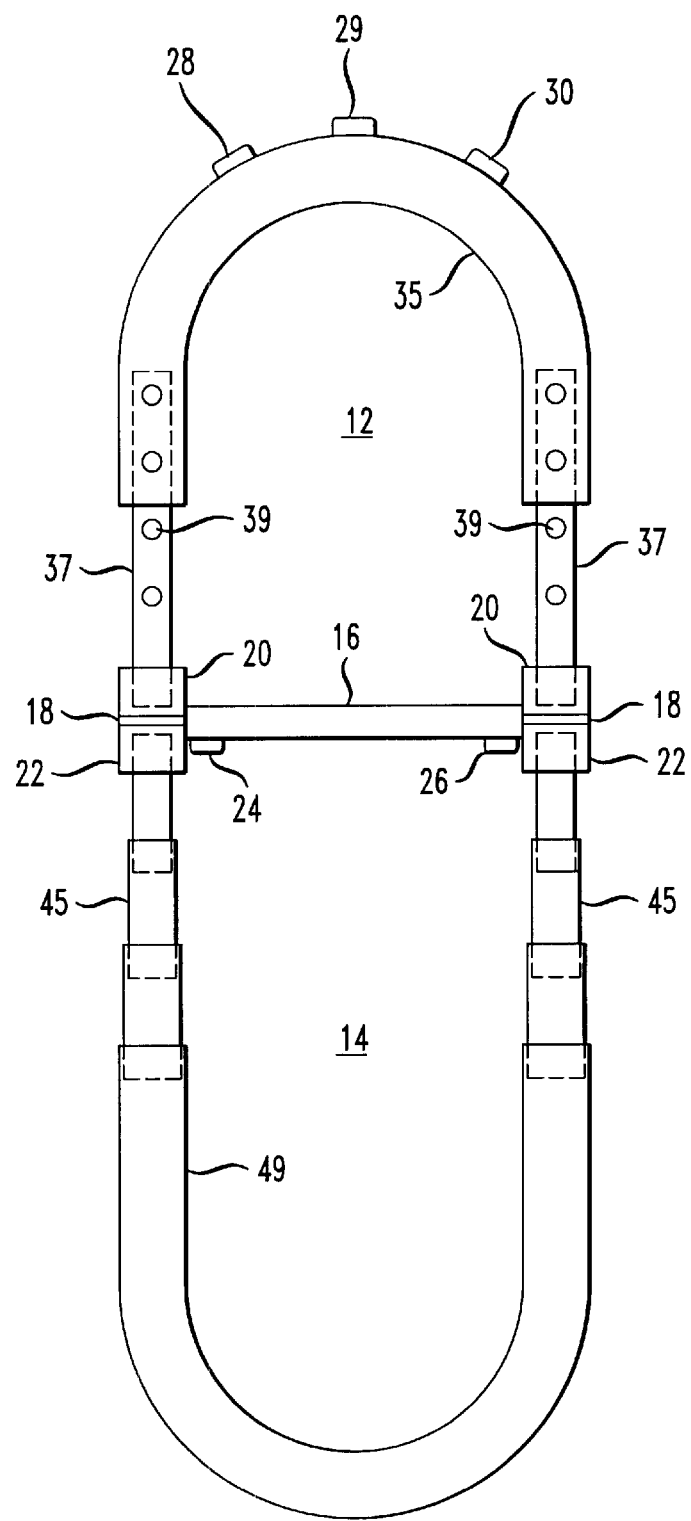
FIG. 2 is a plan view of the baby changing table frame.

Similarly, the lower section 14 consists of adjustable portions as well, 43, 45, 47, 49, illustratively shown in FIGS. 1 and 2 as able to telescope within one another in well known manner—although a comparable push-pin and aperture arrangement can be employed as with the upper section 12. Such telescoping may follow by having the ends of one tube crimped slightly when inserted in a second tube with a stop to secure the tubes together. In this manner—again for comfort or convenience, or so as to suitably fit the size of the infant being changed—the length of the lower section 14 can be adjusted along the direction of the Arrow B. In accordance with the invention, however, the maximum length in the direction B (and as illustrated in FIG. 1), is one in which the lower section 14 falls short of the rear seat of the automobile for both instances of the front seat being moved forwardly or rearwardly—and, in general, is one which when closed does not exceed the length of the upper section when in its shortest setting. As will be understood then, the end 50 of the lower section 14 will rest on the knees of the parent performing the baby cleaning and changing, as the parent sits on the automobile rear seat.

Figure 3:
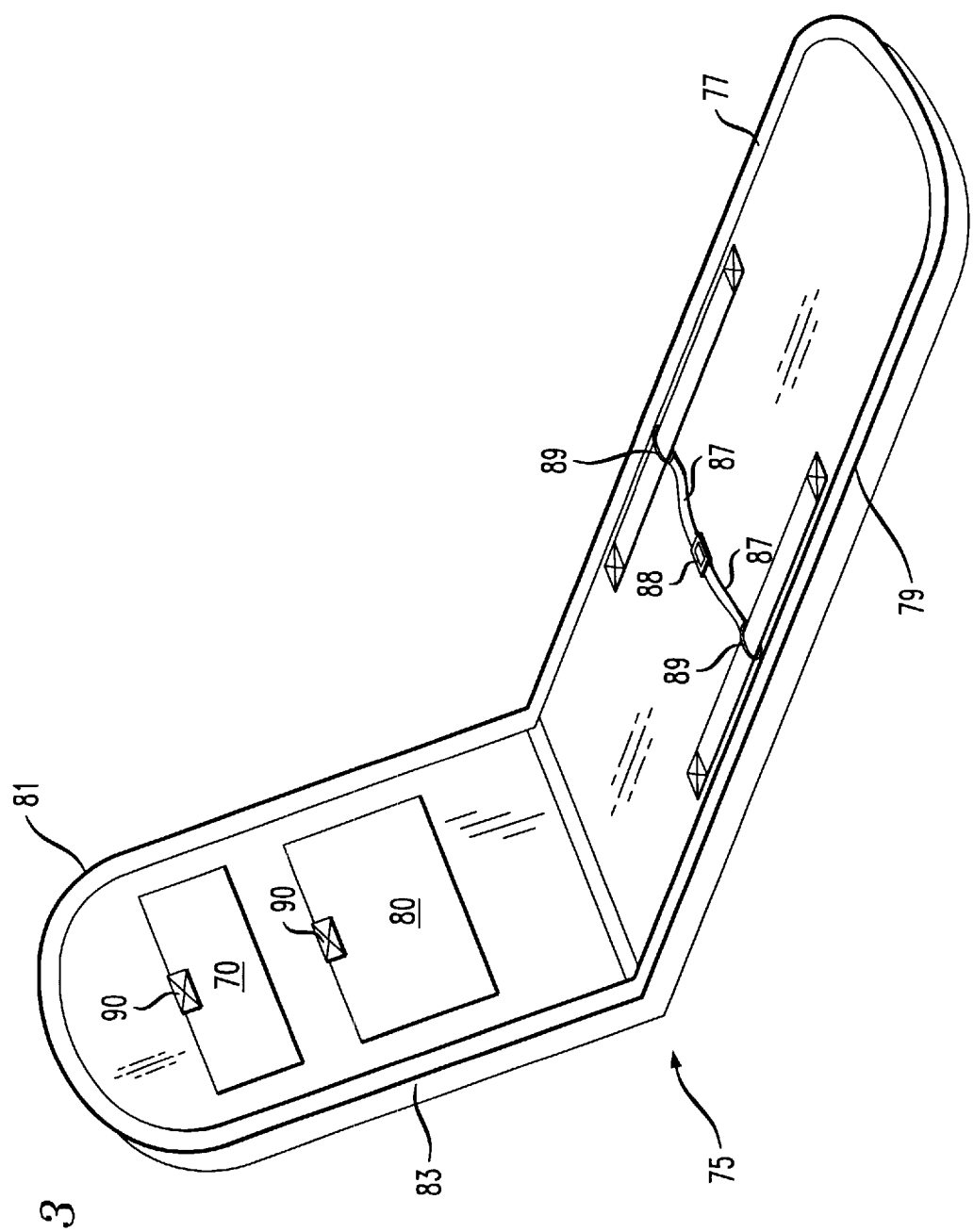
FIG. 3 is a side perspective view of the baby changing table with its cover in position, showing the strap which restrains the infant's moving about when being changed.

In accordance with the invention, the frame 10 is overlain by a cover 75, secured by Velcro or snaps, or of the type having sleeves, for example, through which the frame pieces fit in being inserted, as generally shown at 77, 79, 81 and 83 in FIG. 3. A pair of pocket enclosures 70, 80 are shown, to receive "baby-wipes" in one of them, and disposable diapers in the other—although, obviously, other items for baby changing use, or otherwise, may be kept there as well, or only one pocket enclosure provided, if desired. Each of the pocket enclosures 70, 80 is shown as being closeably openable, similarly through the use of "snaps", "Velcro", or other available types of fasteners 90.

When not in use, the lower section 14 is folded upwardly by the hinges 18 to overlie the upper section 12, and to be fastened therewith, as by the "snaps" 85 of FIG. 1. When desired to be used, the "snaps" 85 are uncoupled, and the lower section 14 is adjusted by the hinge 18 and the telescoping arrangement downwardly and rearwardly, towards and on to the knees of the parent or adult sitting on the back seat.

The infant is then positioned on the opened baby changing table, and a strap and buckle arrangement 87, 88 extending between the lower section frame at 89, stretched to reach over and about the infant, to be tightened in place as at the middle, about the torso of the infant in restraining the baby from squirming. After the cleaning and changing has been completed, the buckle 88 is released, the straps 87 removed, and the infant lifted away. The parent or adult in the back seat then folds up the lower section 14 back to the upper section 12, where it is secured as before, as by the "snaps" 85. As will be understood, the arrangement 87, 88 may be secured around guide tracks sewn at either end to the cover 75 to slide up and down in adjusting to the size of the baby.

In such method of use, the baby changing table then remains in position, extending from the headrest of the front seat downwardly against the rear of the front seat, until needed again (with the underside of the upper section 12 facing and adjacent to the back of the front seat, and with its top side facing away from the back of the front seat)—or alternatively, the various straps can be released from the front headrest and from the front seat belt hinges, to entirely remove the changing table for storage in the vehicle's trunk.

While there have been described what are considered to be preferred embodiments of the present invention, it will be readily appreciated by those skilled in the art that modifications can be made without departing from the scope of the teachings herein, of having the opened baby changing table extend from the back of the front seat towards the rear seat, yet falling short thereof, to be supported instead by the knees of the person sitting there to clean and change the infant.

Thus, in those instances where the fastening of the upper section 12 to the headrest on the front seat is to be one where a simple strap extends between the two posts which oftentimes support the headrest, a different arrangement might be desired, as where the strap passes between the posts from the front of the upper section 12, and then clasps back there upon itself; and, in such an instance, and to address this, a third bracket 29 is shown in FIG. 1. A strap from 28 may then extend around the headrest or its posts, to clasp onto a strap connected at 30. For seats having no headrest or post, an optional strap could be used to temporarily connect at 29, going over the top of the headrest, and looping around the strap connected at 28 and 30—thereby holding it in place.

In all these respects, it will be readily understood that such "changing operation" can continue even while the automobile is moving—and can be carried on whether the front seat is maintained upright, or tilted, and at whatever distance from the dashboard is comfortable for the driver sitting behind the wheel. And for at least such reasons, therefore, resort should be had to the claims appended hereto for a true understanding of the scope of the invention.

I claim:

1. A baby changing table for automobiles comprising:
   a substantially planar upper front section;
   a substantially planar lower rear section;

first means bracing said upper and lower sections together along facing edges thereof;

second means hinging said upper and lower sections adjacent one another in closed position and at an angle apart from one another in opened position;

third means fastening said first means around underseat hinges of a front seat construction of said automobile;

fourth means fastening said substantially planar upper section with a headrest of said front seat construction of said automobile; and fifth means releasably securing said upper and lower sections for storage and use;

wherein when opened for use, said substantially planar upper section includes top and bottom surfaces respectively facing away from and towards the back of said front seat construction, wherein said substantially planar lower section includes top and bottom surfaces respectively facing up from and down towards included seat cushions of a rear seat construction of said automobile and wherein said substantially planar lower section is of a length to fall short of said rear seat cushions of said automobile when hinged open for use.

2. The baby changing table of claim 1 wherein said substantially planar lower section is of a length to fall short of said rear seat cushions as said front seat construction of said automobile is moved forward or back.

3. The baby changing table of claim 2 wherein said second means hinges said upper and lower sections at predetermined adjustable angles with respect to one another.

4. The baby changing table of claim 2 wherein said first means braces said substantially planar upper section at predetermined distances with respect to said substantially planar lower section.

5. The baby changing table of claim 2 wherein said first means braces said substantially planar lower section at predetermined distances with respect to said substantially planar upper section.

6. The baby changing table of claim 4 wherein said first means also braces said substantially planar lower section at predetermined distances with respect to said substantially planar upper section.

7. The baby changing table of claim 6 wherein each of said substantially planar upper and lower sections are adjustable in length.

8. The baby changing table of claim 2 wherein said substantially planar upper and lower sections include a cloth covering overlying a supporting frame of one of metal and plastic fabrication.

9. The baby changing table of claim 8 wherein said substantially planar upper section includes at least one pocket enclosure at said top surface thereof.

10. The baby changing table of claim 9 wherein said pocket enclosure is closeably openable.

11. The baby changing table of claim 10 wherein said top surface of said substantially planar upper section faces away from the back of said front seat construction, and having an underside surface facing and adjacent to said back of said front seat construction.

12. The baby changing table of claim 2, also including sixth means extending from opposing side edges of said substantially planar lower section restraining infants placed on said top surface thereof in held position.

* * * * *